United States Patent
Kasa et al.

(10) Patent No.: US 10,740,536 B2
(45) Date of Patent: Aug. 11, 2020

(54) DYNAMIC SURVEY GENERATION AND VERIFICATION

(71) Applicant: INTERNATIONAL BUSINESS MACHINES CORPORATION, Armonk, NY (US)

(72) Inventors: Jyotsna Kasa, Visakhapatnam (IN); Saraswathi Sailaja Perumalla, Visakhapatnam (IN); Malathy Desikan, Visakhapatnam (IN); Subha Kiran Patnaikuni, Visakhapatnam (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/055,990

(22) Filed: Aug. 6, 2018

(65) Prior Publication Data
US 2020/0042577 A1 Feb. 6, 2020

(51) Int. Cl.
*G06F 17/00* (2019.01)
*G06F 40/117* (2020.01)
*G06F 3/0482* (2013.01)
*G06Q 30/02* (2012.01)
*G06F 40/166* (2020.01)

(52) U.S. Cl.
CPC .......... *G06F 40/117* (2020.01); *G06F 3/0482* (2013.01); *G06F 40/166* (2020.01); *G06Q 30/0203* (2013.01)

(58) Field of Classification Search
CPC ... G06Q 30/0203; G06F 17/218; G06F 17/24; G06F 3/0482; G06F 40/117; G06F 40/166
See application file for complete search history.

(56) References Cited

U.S. PATENT DOCUMENTS 6,477,504 B1 * 11/2002 Hamlin .................. G06Q 10/06
                                                          705/7.32
7,158,988 B1 * 1/2007 Kirkpatrick ............ G06Q 30/02
(Continued)

OTHER PUBLICATIONS

Oppenheimer, Daniel M., et al, "Instructional Manipulation Checks: Detecting Satisficing to Increase Statistical Power", Princeton University, Department of Psychology, downloaded from www.elsevier.com/locate/jesp, available online Apr. 5, 2009, pp. 867-872. Year: 2009).*

*Primary Examiner* — Laurie A Ries
(74) *Attorney, Agent, or Firm* — Cantor Colburn LLP; Richard Wilhelm

(57) ABSTRACT

According to one or more embodiments of the present invention, a system includes a user device to participate in a survey, and a server coupled with the user device to facilitate dynamic survey adjustment by performing a method that includes creating a survey based at least in part on a set of survey questions. The method further includes inserting an attentiveness question at a random position in the survey, wherein a response to the attentiveness question is indicative of an attentiveness of a survey taker to the survey. The method further includes, in response to receiving the response to the attentiveness question from the survey taker, performing one or more dynamic survey adjustments. The dynamic survey adjustments includes adjusting a weightage associated with one or more responses provided by the survey taker.

20 Claims, 10 Drawing Sheets

(56) References Cited

U.S. PATENT DOCUMENTS

| | | | | |
|---|---|---|---|---|
| 8,996,437 B2* | 3/2015 | Brillhart | ............ | G06Q 30/0203 706/46 |
| 9,349,099 B2* | 5/2016 | Pinckney | ............... | G06Q 30/02 |
| 9,400,956 B2* | 7/2016 | Eggebraaten | .......... | G06N 7/005 |
| 9,639,816 B2* | 5/2017 | Eggers | ............... | G06Q 30/0203 |
| 9,977,562 B2* | 5/2018 | Bose | ............... | G06F 3/0481 |
| 10,043,410 B1* | 8/2018 | Swank | .................... | G09B 7/08 |
| 10,163,117 B2* | 12/2018 | Edmonds | .......... | G06Q 30/0201 |
| 10,430,811 B1* | 10/2019 | Roberts | ............. | G06Q 30/0202 |
| 2002/0035486 A1* | 3/2002 | Huyn | ................. | G06F 19/3418 705/3 |
| 2003/0050928 A1* | 3/2003 | Hays | ..................... | G06Q 10/10 |
| 2005/0021388 A1* | 1/2005 | Hatcher | ................ | G06Q 30/02 705/7.32 |
| 2010/0312650 A1* | 12/2010 | Pinckney | .......... | G06Q 30/0269 705/14.66 |
| 2011/0076663 A1* | 3/2011 | Krallman | ................ | G09B 7/00 434/362 |
| 2011/0137709 A1* | 6/2011 | Meyer | .................... | G06Q 10/00 705/7.32 |
| 2011/0145043 A1* | 6/2011 | Handel | ................. | G06Q 30/02 705/14.2 |
| 2011/0217832 A1* | 9/2011 | Raorane | ............ | H01L 21/31116 438/589 |
| 2011/0231226 A1* | 9/2011 | Golden | ................. | G06Q 20/10 705/7.32 |
| 2014/0100858 A1* | 4/2014 | Grollmuss | ............. | G06Q 50/22 705/2 |
| 2014/0272898 A1* | 9/2014 | Ryan | ................... | G06Q 30/0243 434/353 |
| 2014/0316856 A1* | 10/2014 | Williams | ............... | G06Q 30/02 705/7.32 |
| 2014/0330618 A1* | 11/2014 | Wong | ................. | G06Q 30/0203 705/7.32 |
| 2014/0330773 A1* | 11/2014 | Brillhart | ............ | G06Q 30/0203 707/609 |
| 2015/0356573 A1* | 12/2015 | Zadrozny | .......... | G06Q 30/0201 705/7.32 |
| 2016/0092894 A1* | 3/2016 | Lu | ......................... | G06F 16/958 705/7.32 |
| 2016/0203500 A1* | 7/2016 | Williams | ........... | G06Q 30/0203 705/7.32 |
| 2016/0283581 A1* | 9/2016 | Berajawala | ......... | G06F 16/3329 |
| 2017/0032395 A1* | 2/2017 | Kaufman | ........... | G06Q 30/0203 |
| 2017/0116555 A1* | 4/2017 | Griffin | ............. | G06Q 10/06393 |
| 2017/0124432 A1* | 5/2017 | Chen | ..................... | G06N 3/0454 |
| 2018/0061264 A1* | 3/2018 | Wong | .................... | G09B 7/077 |
| 2018/0329884 A1* | 11/2018 | Xiong | ................. | G06F 17/2785 |
| 2019/0057414 A1* | 2/2019 | Taylor | ................ | G06Q 30/0245 |
| 2019/0066136 A1* | 2/2019 | Kopikare | ........... | G06Q 30/0203 |
| 2019/0244228 A1* | 8/2019 | Turner | ............... | G06Q 30/0203 |
| 2019/0251168 A1* | 8/2019 | McCann | .................. | G06N 3/08 |
| 2019/0278788 A1* | 9/2019 | Starr | ..................... | G06F 16/955 |

\* cited by examiner

1000

1010

1. I am proud to work for this organization.
Strongly agree 2) Agree 3) Neutral 4) Disagree 5) Strongly Disagree    1110

2. I receive recognition when I do a good job.
Strongly agree 2) Agree 3) Neutral 4) Disagree 5) Strongly Disagree    1110

3. This is random generated question to check your vigilant. Please do not answer/choose any option for this question.    610
1) Apple 2) Ball 3) Parrot 4) cricket    1110

4. I receive the information I need to do my job effectively.
Strongly agree 2) Agree 3) Neutral 4) Disagree 5) Strongly Disagree    1110

5. I would recommend this company as a great place to work.
Strongly agree 2) Agree 3) Neutral 4) Disagree 5) Strongly Disagree    1110

DYNAMIC SURVEY GENERATION AND VERIFICATION

BACKGROUND

The present invention relates to a survey system that dynamically generates a survey, continuously monitors responses to the survey, and dynamically changes the survey based on the responses. The present invention also generally relates to facilitating the survey taker access to one or more stored data items to provide a response.

The intent of a survey is to collect data for the analysis of a group of survey takers, such as from a particular geographic region, employees, project members, class members, or any other group of survey takers. A survey includes a set of questions divided into sections, typically, associated with a specific topic. The question type associated with a survey can vary, e.g., multiple choice, rating scales, free form text responses, etc. Survey systems provide for the manual generation of surveys through a designer tool and a survey designer defining the different sections and the associated questions of the survey. The completed survey is disturbed to the group of survey takers, who are individuals, for completion and the results returned for analysis.

SUMMARY

According to one or more embodiments of the present invention, a computer-implemented method includes creating a survey based at least in part on a set of survey questions. The method further includes inserting an attentiveness question at a random position in the survey, wherein a response to the attentiveness question is indicative of an attentiveness of a survey taker to the survey. The method further includes, in response to receiving the response to the attentiveness question from the survey taker, performing one or more dynamic survey adjustments. The dynamic survey adjustments includes adjusting a weightage associated with one or more responses provided by the survey taker.

According to one or more embodiments of the present invention, a system includes a user device to participate in a survey, and a server coupled with the user device to facilitate dynamic survey adjustment by performing a method that includes creating a survey based at least in part on a set of survey questions. The method further includes inserting an attentiveness question at a random position in the survey, wherein a response to the attentiveness question is indicative of an attentiveness of a survey taker to the survey. The method further includes, in response to receiving the response to the attentiveness question from the survey taker, performing one or more dynamic survey adjustments. The dynamic survey adjustments includes adjusting a weightage associated with one or more responses provided by the survey taker.

According to one or more embodiments of the present invention, a computer program product includes a computer readable storage medium having stored thereon program instructions executable by one or more processing devices to perform a method of executing a dynamic survey generation and verification. The method includes creating a survey based at least in part on a set of survey questions. The method further includes inserting an attentiveness question at a random position in the survey, wherein a response to the attentiveness question is indicative of an attentiveness of a survey taker to the survey. The method further includes, in response to receiving the response to the attentiveness question from the survey taker, performing one or more dynamic survey adjustments. The dynamic survey adjustments includes adjusting a weightage associated with one or more responses provided by the survey taker.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 10 depicts a user-interface element to store and retrieve tagged content by survey takers according to one or more embodiments of the present invention.

DETAILED DESCRIPTION

Figure 1:
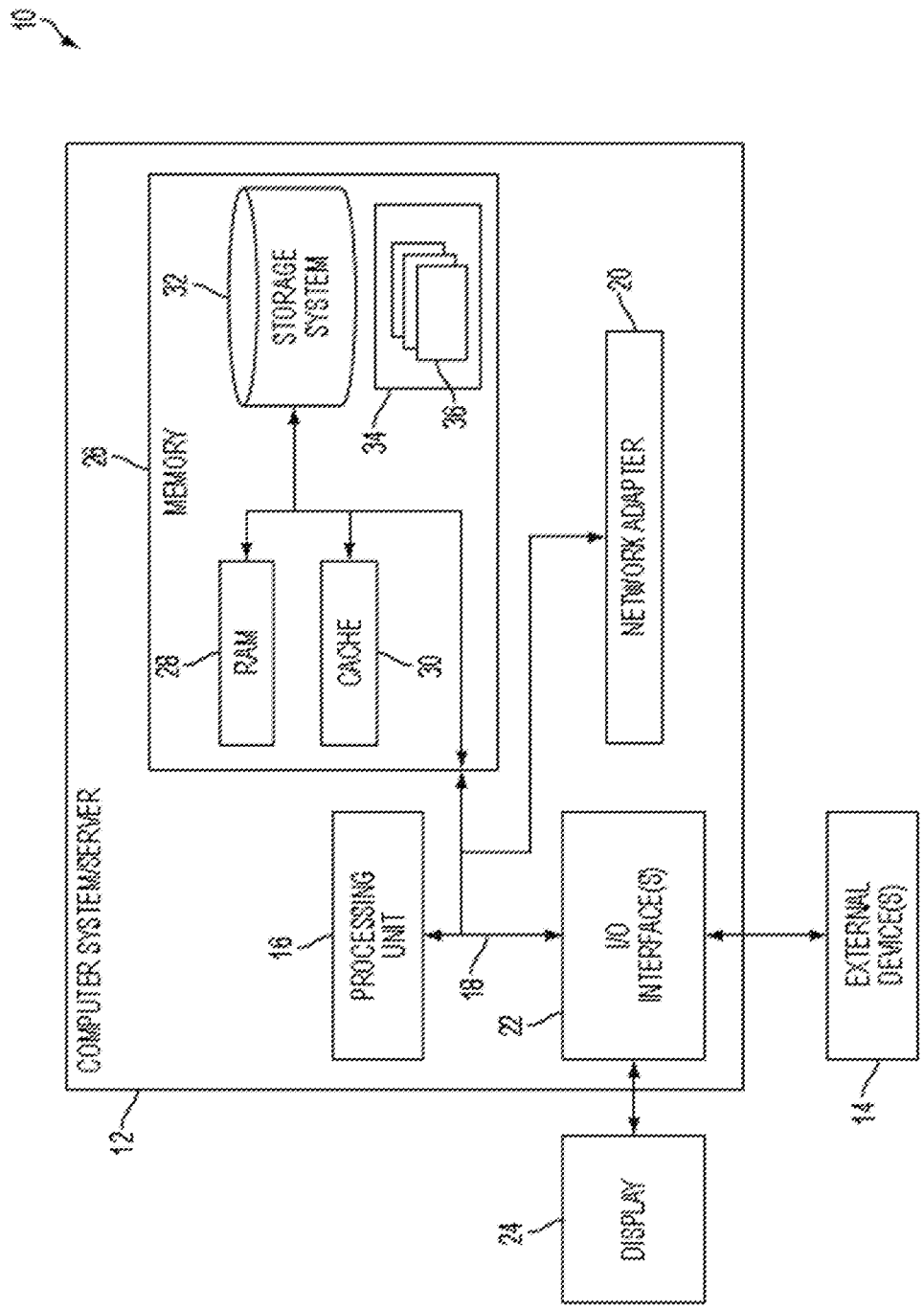
FIG. 1 depicts a cloud computing node according to one or more embodiments of the present invention.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
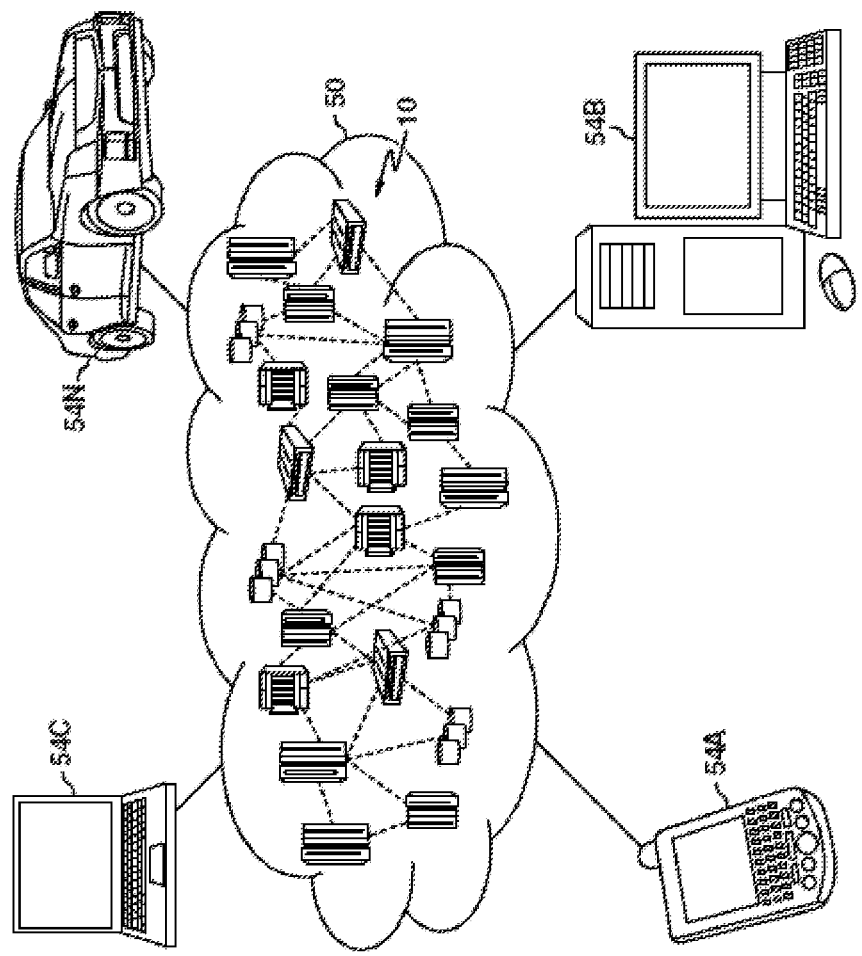
FIG. 2 depicts a cloud computing environment according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
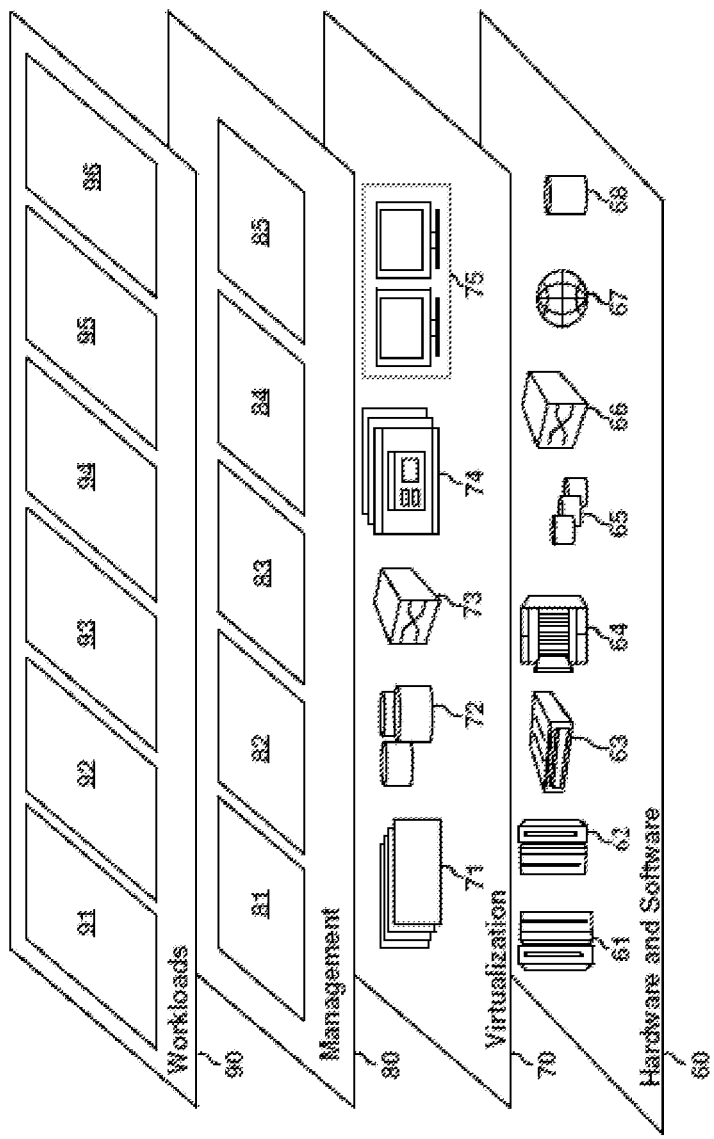
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and survey generation and verification 96.

Surveys are an important tool used for gathering information from a group of survey takers regarding one or more topics. The quality, and subsequent value, of the survey is a function of the survey designer's knowledge of the survey topic. Frequently, the survey designer is not an expert on the survey topic and relies on manually selecting and/or preparing questions based on related topics or selecting a predefined survey template associated with a related topic. The survey creation system is inefficient because the survey designer manually chooses the questions for the survey, resulting in a significant investment in time by the survey designer and a lower quality survey based on the limits of data mining associated with a manual selection system.

Further, the value of the survey responses received from the survey takers depends on the attentiveness of the survey takers when responding to the survey. For example, survey takers may deceive the survey system by answering the questions without reading them. Alternatively, or in addition, a manager or other personnel may prompt and insist the survey taker respond to a survey and provide specific (e.g. positive) feedback. Alternatively, or in addition, the survey taker may respond to the survey on the last day (deadline) before an end time of the survey, causing the survey taker to rush to complete the survey. Such survey responses do not provide true data for the survey organizer to analyze and make decisions based on the survey responses. It should be noted that the above are just a few examples of the survey system being deceived and that there may be several other reasons/causes that result in survey responses that do not provide true data for analysis.

The intention of any organization that conducts the survey is to know the real, true pulse of the survey takers, for example, employees, population from a region, focus group, and the like. The real/true pulse is determined as a result of analyzing the response from the survey. The analysis result can be used to understand the concerns of employees, customers, shareholders, and/or other stakeholders, and further to improve one or more strategies and/or policies.

Typically, surveys are conducted using computing technology. For example, the survey designed generates the survey questions in electronic/digital form. The survey taker (s) access the survey via computing network and provide responses to the one or more questions in the survey via devices such as a computer, a phone, a tablet-computer and the like. The responses are all aggregated and analyzed using a computing device, such as a server. However, such digitalization does not address the technical challenges with receiving real/true data from the survey, as described above. The one or more embodiments of the present invention address such technical challenges.

The survey generation and verification is typically performed in a static manner. The one or more embodiments of the present invention provide a dynamic survey generation that facilitates detecting attentiveness of survey takers during survey participation. Further, the one or more embodiments of the present invention facilitate minimizing the sigma (error) of accuracy/fraud in the results of the survey, thus ensuring that the received data is real/true.

It should be noted that the examples provided herein are in the context of surveys being performed in an organization, where an employer is surveying a group of employees. However, it will be understood that the one or more embodiments of the present invention are applicable in any other context where surveys are being conducted and not just to employee surveys in an organization.

As described earlier, when a survey is rolled out in an organization, the survey organizer desires to ensure that all the survey takers (participants) read the survey questions before responding. The diligence of the survey taker is the critical element in any survey. It is desired that the survey taker should think before answering the survey questions so that the results are accurate. Typical solutions to improve the accuracy of survey responses is to eliminate fraudulent/non-attentive responses from survey analysis. However, such elimination may result in very few survey responses being available for analysis, beating the overarching goal of obtaining real/true data from the survey takers.

Accordingly, according to one or more embodiments of the present invention, instead of eliminating the fraud responses from the survey responses, the survey responses are dynamically and continuously monitored automatically and the survey takers are made to correct the survey responses that are deemed/detected to be non-attentive responses. Eliminating the fraud response can increase the participation rate, but the response from a monitored survey according to one or more embodiments of the present invention, adds more value to the survey results because they result in more accurate results. The one or more embodiments of the present invention accordingly improve the survey systems.

Further, the survey results from existing survey systems result in large amounts of raw (textual) comments in reports, however, such information can largely go unused because of sheer volumes. Existing solutions to such a technical challenge of filtering the large amounts of comments from survey responses include generating word clouds, however, a word cloud does not analyze and just picks the maximally used word, but the differentiation of whether used in positive or negative context stays unanswered. Further, the word cloud is not mapped on any dimension of survey question like work environment, manager feedback, culture of recognition etc., and thus a decisive picture of any underlying issues is not obtained from the survey results. Further yet, typically survey takers tend to take the survey, with a 'Halo effect', such as based on conditions in the surroundings, in the current macro environment, events that may have happened in the recent past, and the like. Hence, the survey takers may not be able to give a 'real' picture, rather the latest picture based on recent events.

The one or more embodiments of the present invention address such technical challenges by facilitating survey takers to store specific data, such as emails, blogs, news articles, and the like, received in electronic format. The stored electronic data is then made available to the survey taker when responding to the one or more survey questions so that the survey taker can provide more complete responses.

In addition, the one or more embodiments of the present invention facilitate the survey designed to access the stored data from the various survey takers to determine the topics that are more relevant to the survey takers. The survey designer can accordingly prepare survey questions that are related to the topics that the survey takers have generally identified and marked for using for survey responses.

Figure 4:
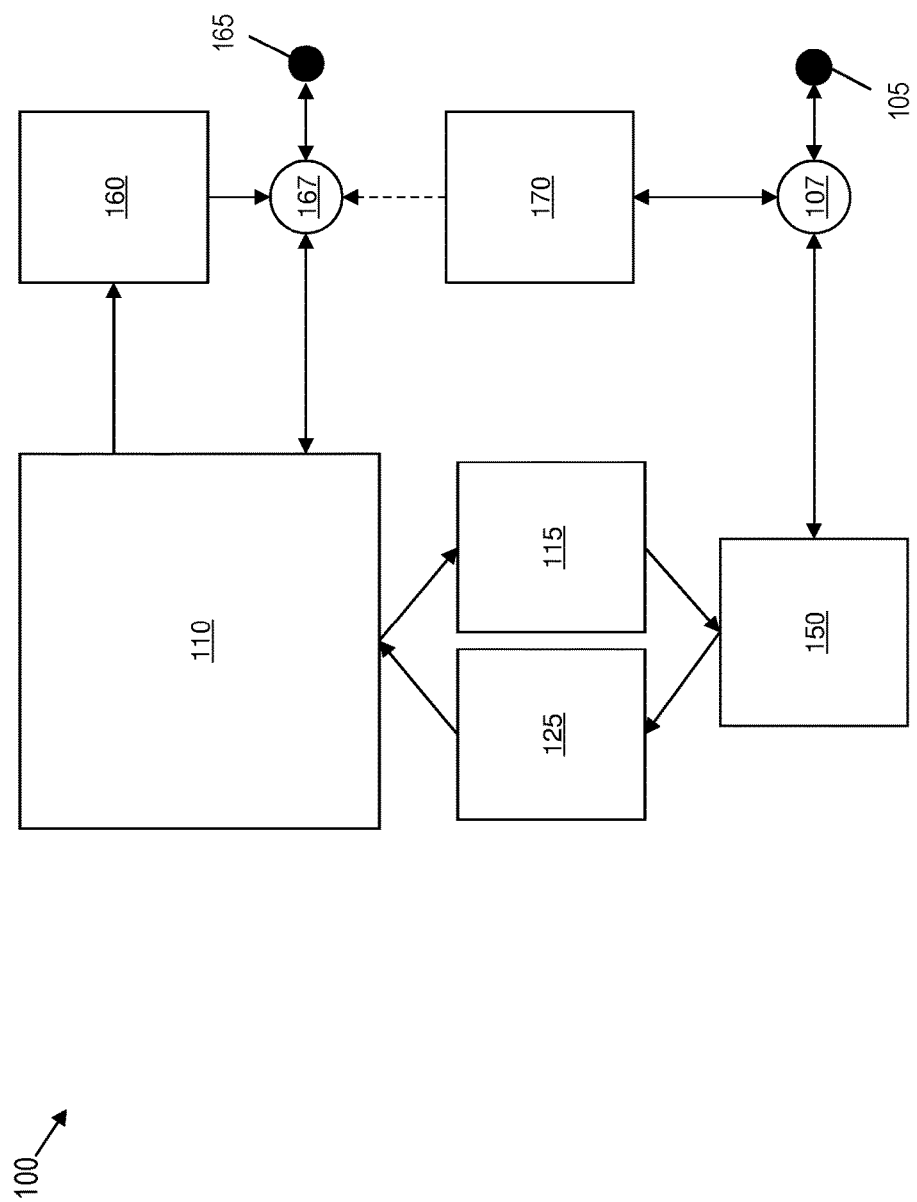
FIG. 4 depicts an example block diagram of a system for dynamic survey generation and analysis according to one or more embodiments of the present invention.

FIG. 4 depicts an example block diagram of a system 100 for dynamic survey generation and analysis according to one or more embodiments of the present invention. The system 100 includes a survey server 110 that provides a survey 150 to be taken by a survey taker 105. The survey 150 can include a set of survey questions 115 and corresponding survey responses 125. In one or more examples, the survey questions 115 include one or more questions that are selected by a survey organizer 165. The survey responses 125 are analyzed providing analysis results 160 to the survey organizer 165. In one or more examples, the survey questions are selected or created based on tagged data 170 that is stored by the survey taker 105.

It should be noted that although a single survey taker 105 is depicted, the survey taker 105 can include two or more survey takers 105. The survey takers 105 can be individuals from an organization, a community, a focus group, a target audience, or any other group of people. The survey organizer 165 can include two or more survey organizers 165, in one or more examples. The survey organizer 165 can be an organization, a community board, a marketing department, or any other entity that desires to accumulate information from the survey takers 105.

The survey server 110 can be one or more computing devices that facilitate providing the survey questions 115 and receiving the survey responses 125, to/from the survey takers 105. In one or more examples, the survey server is a computer server, or any other computer device. The survey takers 105 can interact with the survey 150 via a user device 107, such as a desktop computer, a laptop computer, a tablet computer, a phone, or any other computing device that facilitates receiving the survey questions 115 from the survey computer and providing the survey responses 125 back to the survey computer 150. The survey taker 105 can also use the user device 107 to store the tagged data 170 that is used by the survey organizer 165 to create the survey 150 and/or by the survey taker 105 to respond to the survey 150. As described herein, the survey taker 105 stores the tagged data 170 to respond to the survey 150 at a later time. In one or more examples, the survey taker 105 can use different user devices 107 for tagging data and for responding to the survey 150.

The survey organizer 165 can access the tagged data 170 using a computing device 167, such as a desktop computer, a laptop computer, a tablet computer, a phone, or any other computing device that facilitates selecting the survey questions 115 and receiving the survey responses 125 and analysis results via the survey server 110. In one or more examples, the survey organizer 165 can use different user devices 167 for retrieving tagged data 170 and selecting the survey questions 115.

Figure 5:
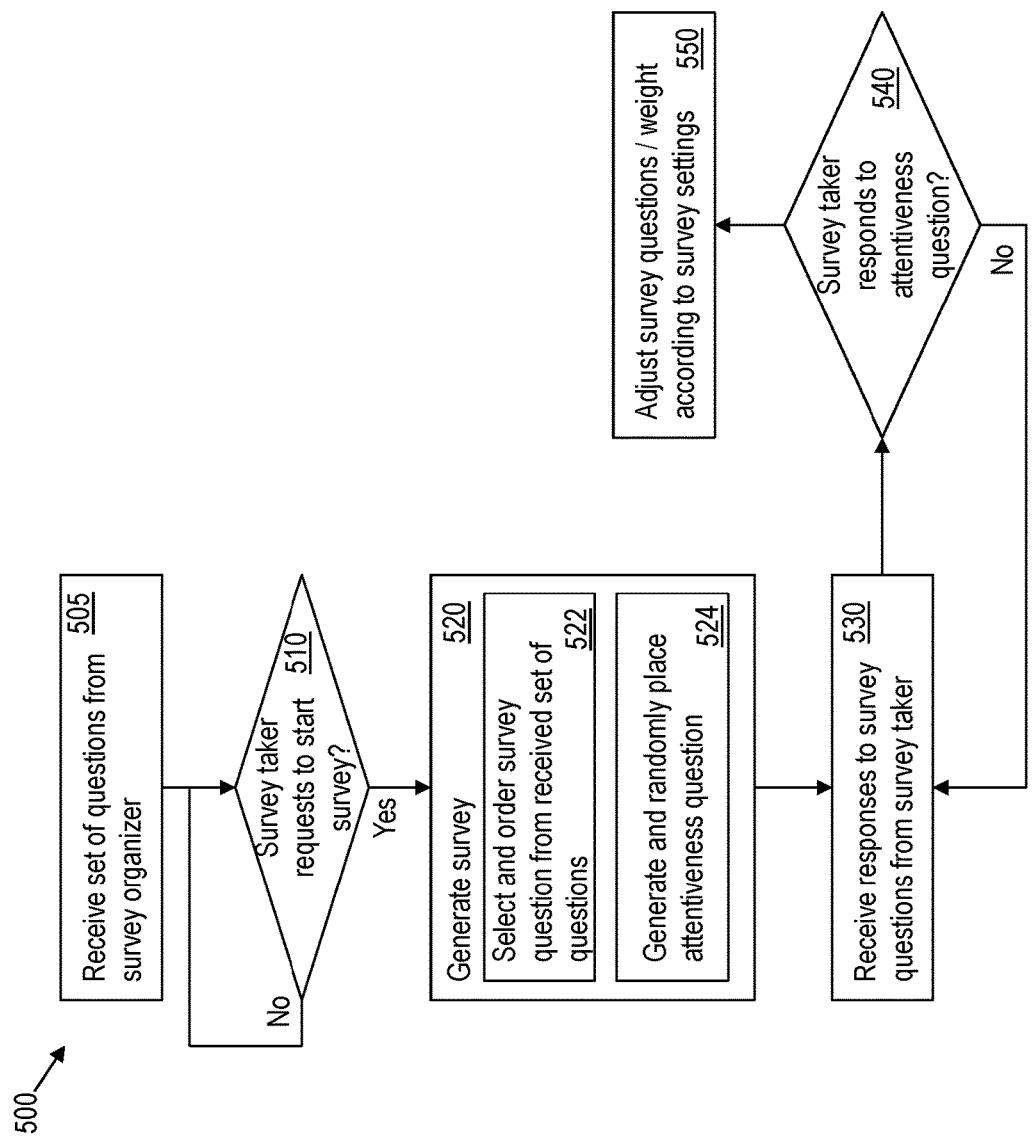
FIG. 5 depicts a flowchart for an example method of automatic dynamic survey generation according to one or more embodiments of the present invention.

FIG. 5 depicts a flowchart for an example method 500 of automatic dynamic survey generation according to one or more embodiments of the present invention. The method 500 includes receiving a set of questions from the survey organizer 165, at 505. The set of questions can be based on the tagged data 170 that the survey takers 105 have stored. The method 500 further includes the survey server 110 waiting for a request to initiate the survey 150 from a survey taker 105, at 510.

Once a survey taker 105 initiates a survey, at 510, the server 110 generates the survey 150, at 520. Generating the survey 150 can include selecting and ordering one or more questions from the received survey questions, at 522. In one or more examples, the selected questions can include all of the received survey questions. The order of the selected survey questions is randomized, in one or more examples. Further, in one or more examples, the wording of the selected questions can be adjusted, for example, based on a semantic analysis of the survey questions. Accordingly, a first survey taker 105 gets a survey 150 that is different than the survey 150 that is taken by a second survey taker 105. The difference can be in the order of the questions in the survey 150, the wording of the questions, and the like.

Further, generating the survey 150 includes generating one or more attentiveness questions, at 524. An attentiveness question is used to determine whether the survey taker 105 is being attentive when responding to the survey questions 115. In one or more examples, the attentiveness question includes a command to the survey taker 105 that is indicative of how to respond to that particular question. Alternatively, or in addition, the attentiveness question can include the expected response itself. If the survey taker 105 does not respond as per the command in the attentiveness question, the server 110 can deem that the survey taker 105 is not being attentive.

Alternatively, or in addition, the attentiveness question can be a question that has a definite answer with which the survey taker 105 is expected to respond, for example, a basic arithmetic question (e.g. 2+2?).

In one or more examples, the attentiveness question can be a question that the survey taker 105 is not supposed to respond to. An example attentiveness question is "This is a system generated question for your attentiveness. Please skip this and proceed with the rest of the questions. Answer Choices: 1) aa 2) bb 3) cc 4) dd." While answering the survey questions 115, when the survey taker 105 comes across the above question s/he is not supposed to select any of the options from the answer choices. This attentiveness question has different choices as 1, 2, 3 and 4 because, even if the survey taker 105 does not read the question, at least upon seeing the answer choices, which are different from the rest of the survey questions 115, s/he may pay attention. The attentiveness question is randomly placed among the selected survey questions 115.

The server 110 can randomly generate the attentiveness question using predetermined rules, or can randomly select the attentiveness question from a predetermined set of attentiveness questions. The server 110 dynamically inserts the attentiveness question into the survey 150 at a random position between the survey questions 115. Accordingly, a first survey taker 105 may encounter an attentiveness question at a first position, while a second survey taker 105 encounters an attentiveness question at a second position. Further, the attentiveness questions encountered by the first survey taker and the second survey taker can be different.

Figure 6:
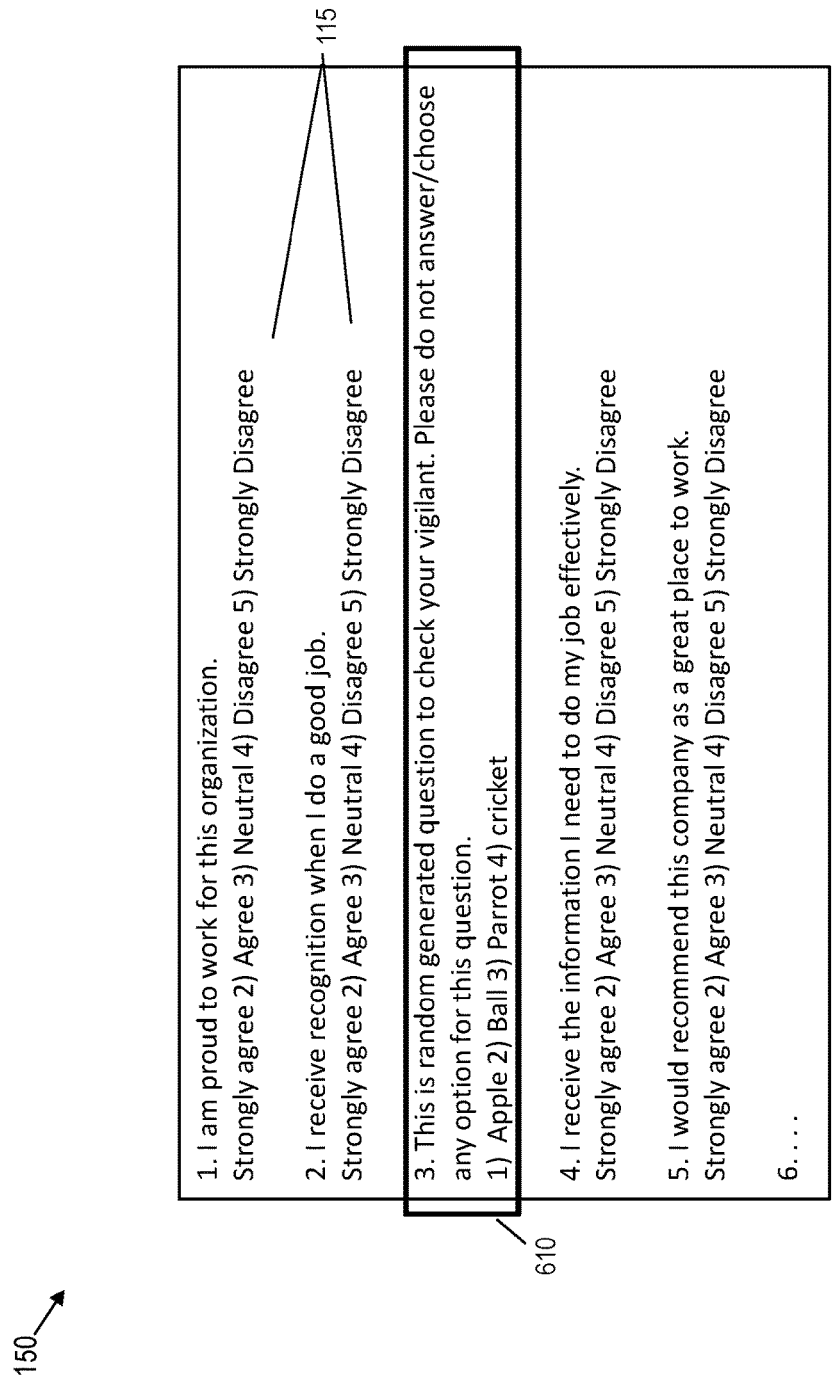
FIG. 6 shows an example survey according to one or more embodiments of the present invention.

FIG. 6 shows an example survey 150 according to one or more embodiments of the present invention. An attentiveness question 610 is placed at a random position in the survey 150. The order of the survey questions 115 in the survey varies from one survey taker to another. In one or more examples, the random position at which the attentiveness question 610 is placed at in the survey 150 depends on a number of survey questions 115 that are in the survey 150. For example, an attentiveness question 610 is generated for each X survey questions 115. Alternatively, or in addition, if the survey questions 115 are divided into multiple sections by the survey organizer 165, an attentiveness question 610 is generated and randomly placed in each section.

Information regarding the random auto generated attentiveness question 610 can be mentioned in a survey instructions page that is displayed prior to or at the initiation of the survey 150. The disclosure of the presence of attentiveness questions can make the survey taker 105 be more attentive during the survey response process.

Referring to FIG. 5, the method 500 further includes monitoring, by the server 110, the survey responses 125 being received from the survey taker 105, at 530. The server 110 checks if the survey taker 105 responds to the attentiveness question 610, at 540. If the survey taker 105 does not respond to the attentiveness question 610, the survey responses are received continuously. If the survey taker 105 does respond to the attentiveness question 610, it is deemed that the survey taker 105 is not being attentive, and the survey questions 115, and/or a weight used to assess the survey responses 125, from the survey taker 105 are adjusted according to survey settings, at 550.

Figure 7:
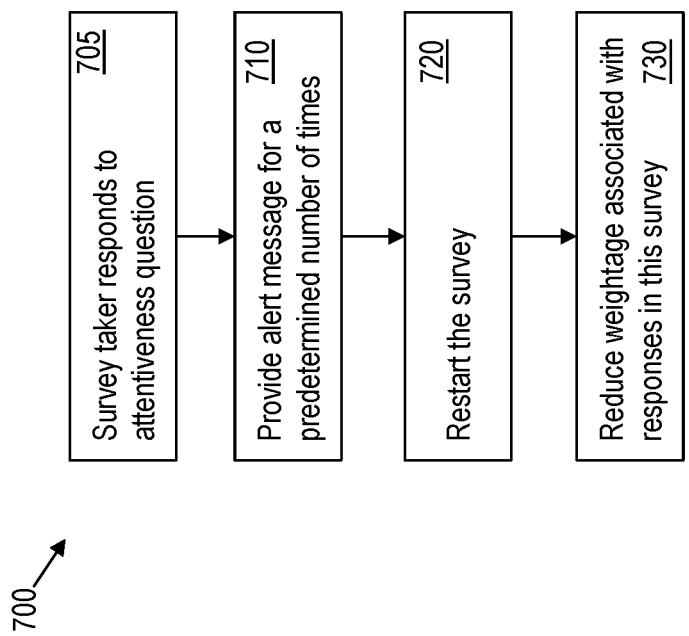
FIG. 7 depicts a flowchart for a method of dynamically adjusting a survey according to one or more embodiments of the present invention.

FIG. 7 depicts a flowchart for a method 700 of dynamically adjusting the survey 150 according to one or more embodiments of the present invention. In one or more examples, if the survey taker 105 attempts the attentiveness question 610, a message, such as a pop-up, or any other user-interface alert message is provided, at 705 and 710. The message can include an indication of an action being taken in response to the survey taker 105 not being attentive when participating in the survey 150. For example, the alert message can indicate to the survey taker 105 that: "You are attempting a question that is not part of the survey. Your survey questions will be reordered and survey will start again without your previously saved responses." Such a message may be provided a limited number of times such as, for example, once, thrice etc. to the survey taker 105 so that the survey taker 105 is more attentive when participating in the survey 150.

Further, the method 700 can include restarting the survey 150, at 720. In one or more examples, the restart is performed to reposition the attentiveness question(s) 610 in the survey 150. In one or more examples, the questions 115 that the survey taker 105 has already responded to are also repositioned in the survey 150. Further yet, in one or more examples, the answer choices for the survey questions 115 are also reordered so that the survey taker 105 has to respond attentively.

Alternatively, or in addition, the survey 150 is continued without alerting the survey taker 105, however, a weightage associated with the responses provided by this survey taker is reduced, at 730. In one or more examples, the weightage for responses only in the present section of survey questions 115 is reduced. The present section includes a set of questions grouped together by the survey designer 165, for example, based on a specific topic, a specific event, and the like.

It should be noted that one or more of the above adjustments can be performed, for example, by restarting the survey and reducing weightage. The adjustment can be based on a setting associated with the survey 150 that is selected by the survey organizer 165. If the survey 150 is restarted, the method 500 (FIG. 5) is repeated.

Figure 8:
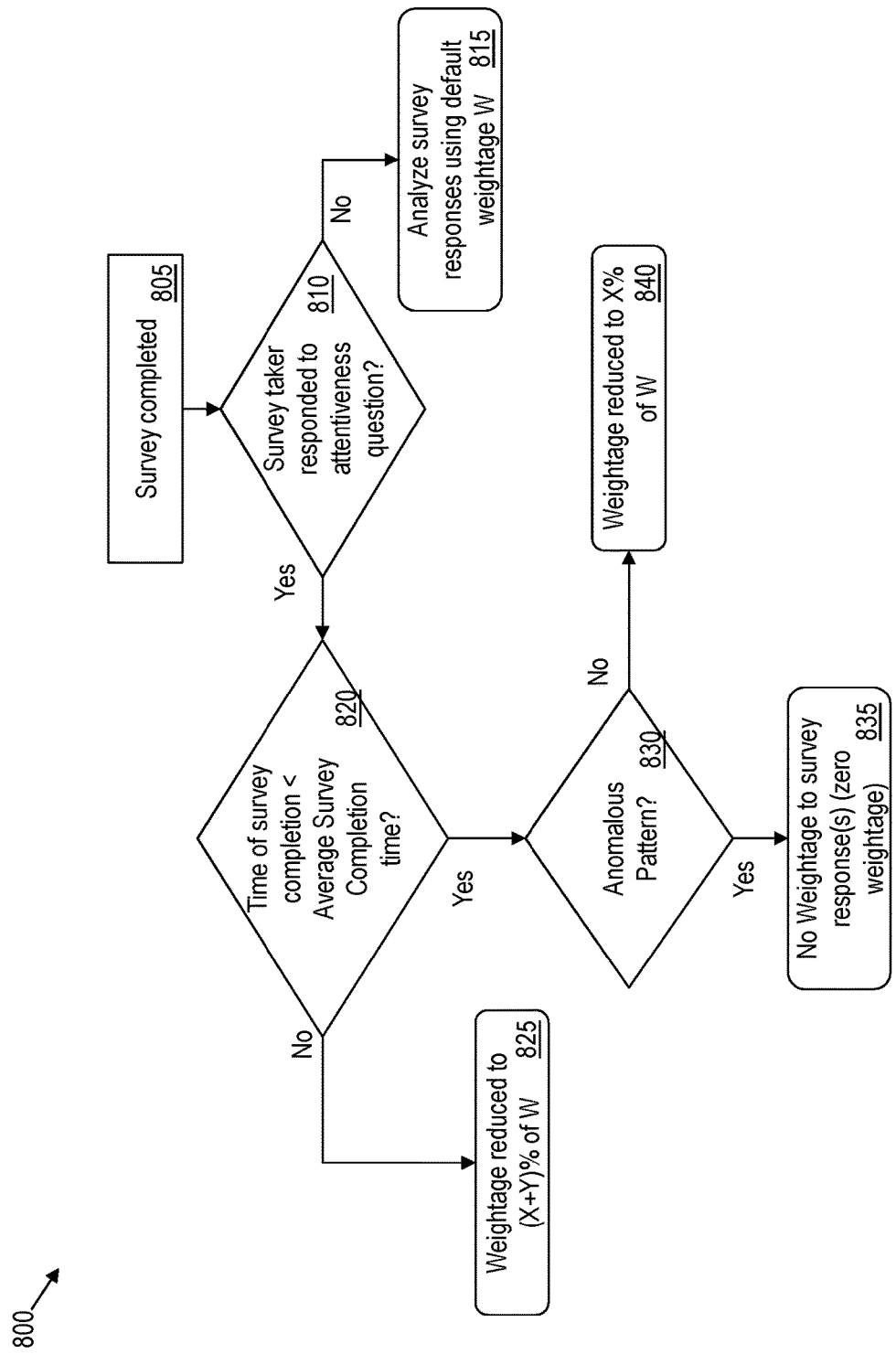
FIG. 8 depicts a flowchart for an example method of dynamically adjusting weightage of survey responses according to one or more embodiments of the present invention.

FIG. 8 depicts a flowchart for an example method 800 of dynamically adjusting weightage of the survey responses 125 according to one or more embodiments of the present invention. Once the survey taker 105 has completed responding to the survey questions 115, at 805, with the attentiveness question(s) 610 that are placed in the survey 150, the server 110 configures a weightage for the survey responses 125 that are received. The method 800 includes determining whether one or more of the attentiveness question(s) 610 were responded to, at 810. If the attentiveness question(s) 610 are not responded to, it is deemed that the survey taker 105 was attentive when participating in the survey 150. Accordingly, a predetermined default weightage (W) is assigned to the survey responses 125, at 815. The weightage that is associated with the survey responses 125 is used when analyzing the survey responses 125 received from the group of survey takers 105 participating in the survey 150.

Instead, if the attentiveness question(s) 610 was/were responded to, at 810, the method includes checking how much time the survey taker 105 spent to complete the survey 150, at 820. A predetermined minimum amount of time may be assigned to the survey 150 by the survey organizer 165, which is used as a first threshold. Further, an average amount of time is computed for the survey 150 based on time required by other survey takers 105, particularly the survey takers 105 who did not respond to the attentiveness question (s) 610. The survey server 110 monitors the amount of time a survey taker 105 takes to complete the survey and keeps track of a running average survey time, which is used as a second threshold. Either one of the first threshold or the second threshold can be used as a threshold to compare the survey time for the present survey taker 105.

If the amount of survey time that the survey taker 105 required to complete the survey responses 125 is less than the threshold, another check is performed to determine if the survey responses 125 are provided in an anomalous manner, at 830. For example, the method 800 includes checking if the survey taker 105 provided all survey responses 125 in a straight line (e.g. all answer choices A), or using any other specific repetitive pattern (e.g. A-B-C-D-A-B . . . ). Other types of anomalous patterns can also be checked. In such a case the survey responses are assigned a zero (0) weightage for the analysis, at 835. Assigning a zero weightage ensures that the survey responses are not used during the analysis. It should be noted that in other examples a different weightage may be assigned.

Alternatively, if the survey taker 105 has not provided the survey responses 125 in an anomalous manner, the weightage is set to a first predetermined level, for example X %, of the default weightage W, at 840. Alternatively yet, if the survey taker 105 has completed the survey responses 125 in greater than (or equal to) the threshold amount of time, at 820, the weightage is reduced to a second predetermined level that is higher than the first predetermined level, for example (X+Y) % of the default weightage W, at 825.

The survey response 125 from all the survey takers 105 are then analyzed according to the weightage assigned to each set of survey responses 125 from the respective survey takers 105, and the analysis 160 is provided to the survey organizers 165.

Figure 9:
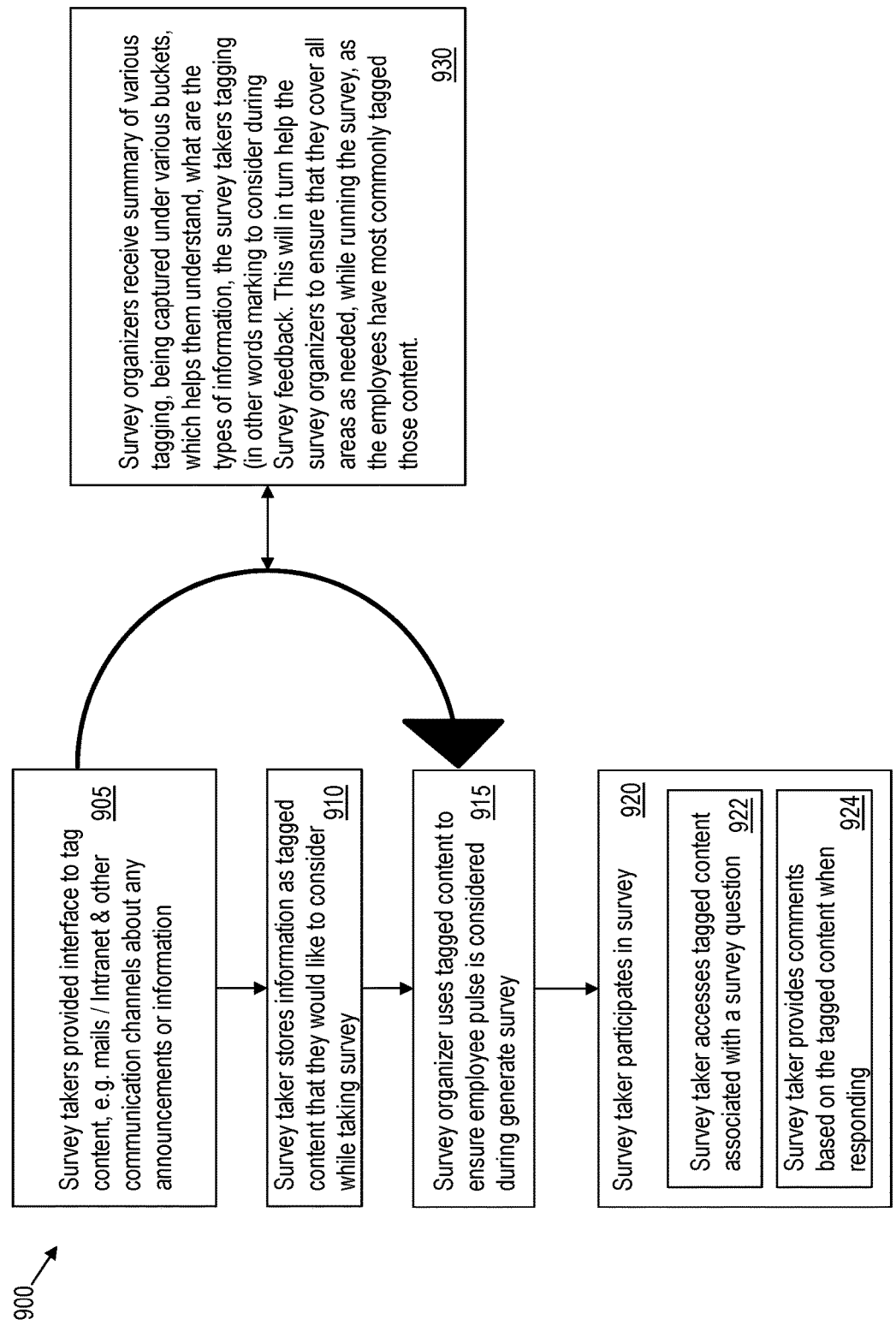
FIG. 9 depicts a flowchart for an example method of using tagged data when providing survey responses according to one or more embodiments of the present invention.

FIG. 9 depicts a flowchart for an example method 900 of using tagged data when providing the survey responses 125 according to one or more embodiments of the present invention. The method 900 includes the survey organizer 165 sending information to survey takers 105 that has a user-interface element associated with it to store as tagged data 170, at 905.

FIG. 10 depicts a user-interface element 1010 to store and retrieve tagged content by the survey takers 105 according to one or more embodiments of the present invention. The survey organizer 165 can provide information 1000 in various forms, such as emails, wiki comments, blog posts, social media posts, and so on. Survey takers 105 can tag the information 1000 while they read any email communications, blog posts, or other information type. The tagging user interface 1010 can also be associated to emails when a particular communication or service is provided, for example, as part of employee welfare, such as transport, canteen facilities, diversity initiatives, and the like. The tagged content 170 is available to retrieve during a future survey session. This creates more engagement to employees and they get understanding of the benefits they received from company when participating in the survey 150. This tagging ensures the survey takers 105 keep track of various events that can help them make a decision, when there participating the survey 150 on various subjects, in order to avoid the halo effect. The survey methodology used, gives a provision for the survey takers 105 to obtain the tags that they have used, while they start the survey.

In one or more examples, each of the information 1000 elements has the user-interface element 1010, such as a button, a link, or the like, that the survey taker 105 can use (interact with) to tag that information 1000 to be stored in the tagged data 170, at 910. The tagged data 170 is stored per survey taker, in one or more examples. Alternatively, or in addition, the tagged data 170 can be stored such that each survey taker 105 can access all the tagged data 170, regardless of who stored it.

Referring to FIG. 9, the operations of sending information 1000 and storing tagged data 170 may be repeated one or more times during a period of time prior to the time the survey is to be taken. For example, the survey 150 may be created every December and throughout the rest of the time in the year, the above operations may be performed to accumulate the tagged data 170.

The survey organizer 165, at the time of the survey creation can use the tagged data 170 to select/create the survey questions 115, at 915. For example, the survey organizer 165 can receive summary of various tagging, being captured under various buckets, which helps them understand, what are the types of information that the survey takers are tagging, at 930. In other words the survey organizers 165 receive content that is being marked to consider during survey feedback. This in turn helps the survey organizers 165 to ensure that they cover all areas as needed in the survey, while composing the survey, using the content that the survey takers have most commonly tagged. In one or more examples, the summarized data can include statistics such as a number of times a particular information 1000 was tagged by the survey takers 105. The survey organizer may not have access to specific survey taker's 105 tagged content, rather a non-personal, anonymous view of the tagged data 170. Accordingly, the survey organizer 165 can create survey questions 115 that are related to the information 1000 that the survey takers 105 tagged the most, tagged the least 105, and so on.

The survey taker 105, further, participates in the survey 150 to provide the survey responses 125, at 920. During the participation, the survey taker 105 can access the tagged data 170, for example, the emails, comments, online posts, etc. that are related to the one or more survey questions 115 as a reminder of the one or more events throughout the year, at 922. For example, an email that is tagged may provide a reminder regarding support received from management during the year.

FIG. 10 also depicts the survey 150 with the survey questions 115 having user-interface elements 1110 for accessing corresponding tagged data 170 according to one or more embodiments of the present invention. A survey question 115 may be associated with a user-interface element 1110, such as a button, a link, or the like, that the survey taker 105 can use to access tagged data 170 that is related to that survey question 115 from the information that the survey taker 105 stored. It should be noted that FIG. 10 depicts one user-interface element 1110 for each respective survey question 115, however in other examples, a common user-interface element 1110 may be used for all the survey questions 115. Further, although FIG. 10 depicts a user-interface element for the attentiveness question 610, in one or more examples, the attentiveness questions may not have a corresponding user-interface element 1110. By clicking, or any other interaction, with the user-interface element 1110, the survey taker 105 is provided any tagged content that the survey taker 105 has stored for that survey question 115. Alternatively, or in addition, tagged content from other survey takers 105 can also be provided.

Referring to FIG. 9, the survey taker 105 can provide responses and/or comments to a survey question based on the retrieved tagged data 170, at 924. This can ensure that recent incidents do not affect the feedback provided by the survey takers, who are instead reminded of events throughout the year (or other time period). Hence, the feature of tagged data 170, that connects to flagged emails, posts, documents, and the like during the year (or other time period), reduces the 'Halo' effect on survey participation.

Further, open comments from the survey takers 105 add effectiveness to the survey results. For example, if the survey taker 105, an employee, adds a comment "I am not satisfied with the compensation", in conjunction with a survey response of "strongly agree" to a survey question 115 of "I receive recognition when I do a good job" then, the mapping helps to understand that while the employee is satisfied with rewards, s/he is not satisfied with the base compensation. Such a relationship is necessary otherwise, the survey organizers 165 (management), might conclude that everything is going well in the team if they solely rely on the survey responses. Thus, the open comments, particularly based on the tagged data 170 can facilitate a relative comparison to add value to the survey report. The comments can be categorized as positive or negative based on sematic analysis and the categorization is provided to the survey organizers 165 as part of the analysis 160. For example, the comments given are separated as a Positive and Negative comment, as, for example, a word cloud, but categorized mapping to the question category. The comment categorization mapping can help the survey organizer 165 (management), to get a finer view of the survey taker's 105 (employees') view on each question. When the comments are categorized and given as positive and negative, just as Words, mapping to the question category, also avoids managers to focus on the comment, rather than spending time, on guessing and analyzing who could have given the comments, based on language/pattern. If a manager who is reading the survey comments has a large number of employees to manage, the time taken to read each comment can make it impractical to read all the comments. The categorization, can help reduce this work as well, and in some cases ensure that all the comments are considered.

The survey system 100 can accordingly further facilitate learning from the content that has been tagged by employees/survey takers 105. Accordingly, the survey system 100 can enhance survey questions 15 using the tagged content that is concerning or influencing aspects of the survey takers 105. For example, if the employees of a specific geographic location of an organization had tagged a mail announcement regarding a transport facility that the organization introduced, then an intimation about this tag to the survey organizers 165 can help them add a question about the transport facility in the survey 150. The tagging of the mail announcement for this topic can indicate to the survey organizers 165 that the employees may be willing to give a feedback on this service, positive or negative. Further, the survey system 100 can consider insights from unstructured data provided by survey takers. For example, the unstructured data can include text responses provided by the survey takers 105 and derivations using the text responses as one dimension for building the survey 150. Existing techniques provide only an optional comments section and the comments are not used for further analysis. However, the one or more embodiments of the present invention facilitate using insights from the text in an effective way.

The one or more embodiments of the present invention described herein accordingly facilitate a survey system that dynamically adjusts survey questions and weightage associated with the survey responses by detecting inattentiveness of the survey taker while providing his/her response(s). The attentiveness detection may be performed by reading a response provided for a no weightage random question, referred to as an attentiveness question. A response to the attentiveness question indicates attentiveness of the survey taker 105 to the survey. For example, the attentiveness question can be a question which is not to be answered by the survey taker. If a survey taker provides a response to the attentiveness question separate weightage can be given to that set of survey responses as it indicates the survey taker did not take the survey seriously or s/he provided the responses without reading questions, or provided the responses randomly. In one or more examples, based on survey settings provided by the survey organizers survey, questions can be jumbled with earlier responses retained or the earlier responses cleared. Alternatively, or in addition, survey settings can be configured to re-initiate the survey if inattentiveness (or fake survey participation) is identified. Further, in one or more examples, for a lengthy survey (with more than a predetermined number of question), the survey is categorized into subsets of survey questions and survey taker attentiveness is tested periodically and accordingly, weightage is added to the survey responses. The dynamic and automatic survey adjustment improves overall survey results and helps better capture the information from the survey takers. The attentiveness question can be of other types than the above example. For example, the attentiveness question can be an arithmetic-based question or any other fact based question that has a "correct" answer, such as "2+2?", "first letter of the word 'apple'?", and the like. In yet another example, the attentiveness question can be a previously answered question that has the answers re-ordered. In this example, if the user previously indicated one answer and now indicates another answer, it indicates that the user is not being attentive to the survey.

The one or more embodiments of the present invention further facilitate tagging content, by the survey takers' via user-interface elements added to their typical communication system such as emailing system, wiki pages, blogs, organization communities containing important announcement & decisions, and the like. Such tagged content is displayed as a reference to the survey taker during participation in the survey to help respond to the survey questions. For example, employees can tag the content while they read any email communications or blog posts. The survey system can also provide tagging option to some emails when a particular communication or service is provided as part of employee welfare. [E.g. transport or canteen facilities or diversity initiatives, etc.]. Such tagged content can be used to enhance survey questions in consideration of topics that are concerning or influencing aspects of employees.

Further yet, in one or more examples, the survey system can facilitate a survey taker to feed any questions that s/he feels relevant to an organization to be included in the Survey. For example, if there is a specific issue(s) to a geographic location/demographics which may not be part of the survey questions, a survey taker can feed such questions/points into the survey system for review and consideration for a future survey. The one or more embodiments of the present invention thus facilitate a survey system that considers insights from unstructured data e.g. open text responses provided by survey takers and derivations out of the text responses to be considered in one of the dimensions that survey is built upon. At present, comments section in survey is optional but when the insights are considered using analytics from free text, survey takers and organization(s) tend to gain inputs from the comments in effective way.

Further, during calculation/analysis of the survey responses, the survey system described herein automatically and dynamically minimizes a deviation that can be caused because of inattentive survey takers by taking into consideration the survey time stamp (short time surveys), users who attempted the attentiveness questions, anomalous survey responses. Further, while calculating the survey results for the structured data from the survey questions, open-end comments are displayed in the report as a part of the analysis.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    creating a survey based at least in part on a set of survey questions;
    inserting an attentiveness question at a random position in the survey, wherein a response to the attentiveness question is indicative of an attentiveness of a survey taker to the survey;
    in response to receiving the response to the attentiveness question from the survey taker, performing one or more dynamic survey adjustments, the dynamic survey adjustments comprising:
        adjusting a weightage associated with one or more survey-responses provided by the survey taker, the weightage adjusted by a first value in response a completion time of the survey being at least a predetermined threshold time; and
        adjusting the weightage associated with the one or more survey-responses provided by a second value in response to the completion time being less than the predetermined threshold time; and
    analyzing, according to the weightage, the one or more survey-responses from a plurality of survey-takers respectively.

2. The computer-implemented method of claim 1, wherein the dynamic survey adjustments further comprise restarting the survey.

3. The computer-implemented method of claim 2, wherein the set of survey questions in the survey are reordered prior to restarting the survey.

4. The computer-implemented method of claim 1, wherein the attentiveness question in the survey is a plurality of attentiveness questions.

5. The computer-implemented method of claim 4, wherein the plurality of attentiveness questions comprises an attentiveness question for each section in the survey.

6. The computer-implemented method of claim 1, wherein the attentiveness question is inserted at a first position for a first survey taker and the attentiveness question is inserted at a second position for a second survey taker.

7. The computer-implemented method of claim 1, wherein the attentiveness question is a first type of attentiveness question for a first survey taker and the attentiveness question is a second type of attentiveness question for a second survey taker.

8. The computer-implemented method of claim 1, further comprising:
displaying a user-interface element associated with a survey question, the user-interface elements retrieving tagged content corresponding to the survey question.

9. A system comprising:
a user device configured to participate in a survey; and
a server coupled with the user device to facilitate dynamic survey adjustments, the server configured to perform a method comprising:
creating a survey based at least in part on a set of survey questions;
inserting an attentiveness question at a random position in the survey, wherein a response to the attentiveness question is indicative of an attentiveness of a survey taker to the survey;
in response to receiving the response to the attentiveness question from the survey taker, performing one or more dynamic survey adjustments, the dynamic survey adjustments comprising:
adjusting a weightage associated with one or more survey-responses provided by the survey taker, the weightage adjusted by a first value in response a completion time of the survey being at least a predetermined threshold time; and
adjusting the weightage associated with the one or more survey-responses provided by a second value in response to the completion time being less than the predetermined threshold time; and
analyzing, according to the weightage, the one or more survey-responses from a plurality of survey-takers respectively.

10. The system of claim 9, wherein the dynamic survey adjustments further comprise restarting the survey.

11. The system of claim 10, wherein the set of survey questions in the survey are reordered prior to restarting the survey.

12. The system of claim 9, wherein the attentiveness question is a plurality of attentiveness questions.

13. The system of claim 12, wherein the plurality of attentiveness questions comprises an attentiveness question for each section in the survey.

14. The system of claim 9, wherein the attentiveness question is inserted at a first position for a first survey taker and the attentiveness question is inserted at a second position for a second survey taker.

15. The system of claim 9, wherein the attentiveness question is a first type of attentiveness question for a first survey taker and the attentiveness question is a second type of attentiveness question for a second survey taker.

16. The system of claim 9, wherein the method further comprises displaying a user-interface element associated with a survey question, the user-interface elements retrieving tagged content corresponding to the survey question.

17. A computer program product comprising a computer readable storage medium having stored thereon program instructions executable by one or more processing devices to perform a method of executing a dynamic survey generation and verification, the method comprising:
creating a survey based at least in part on a set of survey questions;
inserting an attentiveness question at a random position in the survey, wherein a response to the attentiveness question indicative of an attentiveness of a survey taker to the survey;
in response to receiving the response to the attentiveness question from the survey taker, performing one or more dynamic survey adjustments, the dynamic survey adjustments comprising:
adjusting a weightage associated with one or more survey-responses provided by the survey taker, the weightage adjusted by a first value in response a completion time of the survey being at least a predetermined threshold time; and
adjusting the weightage associated with the one or more survey-responses provided by a second value in response to the completion time being less than the predetermined threshold time; and
analyzing, according to the weightage, the one or more survey-responses from a plurality of survey-takers respectively.

18. The computer program product of claim 17, wherein the dynamic survey adjustments further comprise restarting the survey and the set of survey questions in the survey are reordered prior to restarting the survey.

19. The computer program product of claim 17, wherein the attentiveness question is a plurality of attentiveness questions, the plurality of attentiveness questions comprises an attentiveness question for each section in the survey.

20. The computer program product of claim 17, wherein the attentiveness question is inserted at a first position for a first survey taker and the attentiveness question is inserted at a second position for a second survey taker.

* * * * *